ial. A yield of 55% of that theoretically possible is

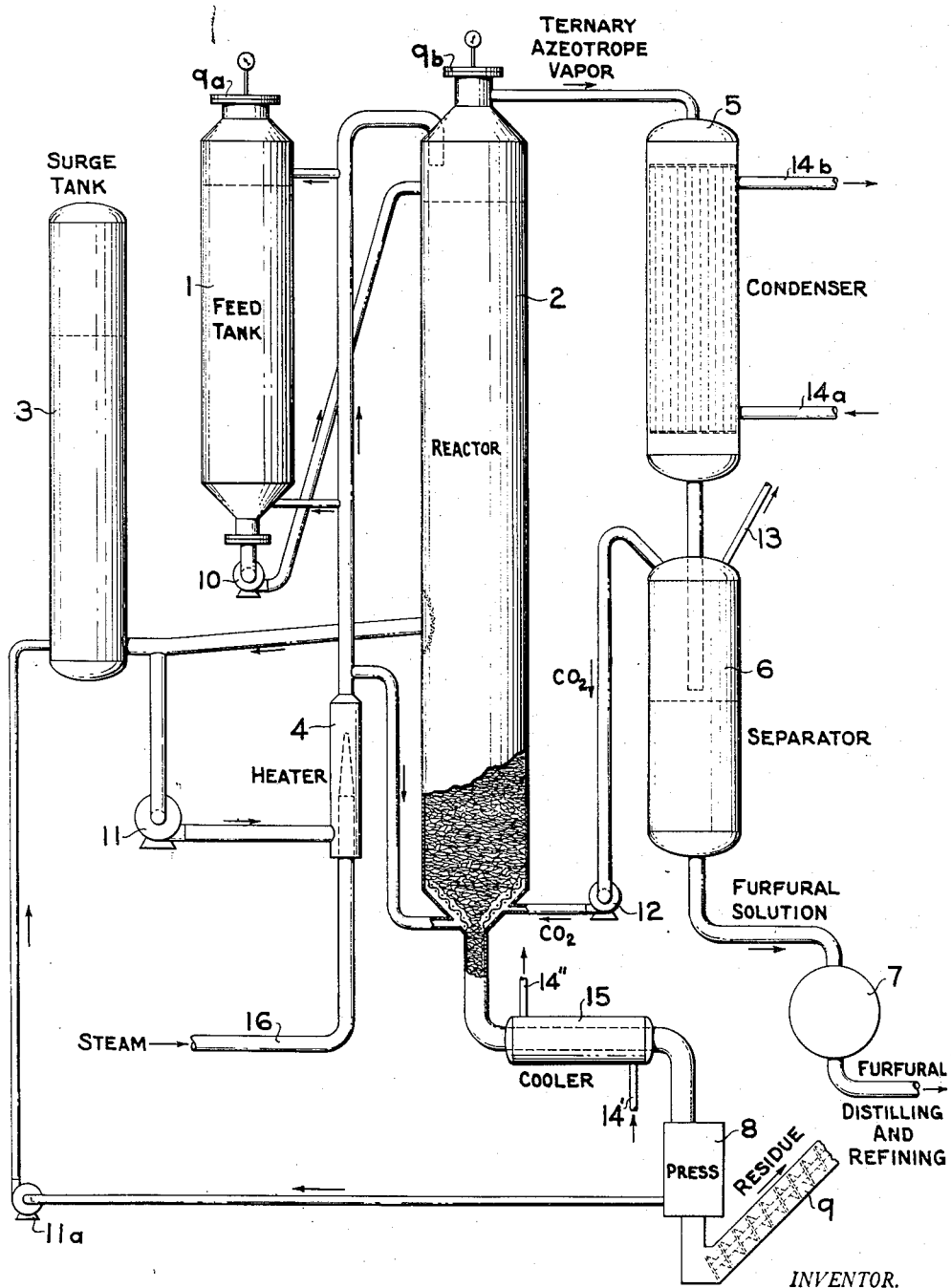

United States Patent Office 2,784,203
Patented Mar. 5, 1957

2,784,203

PROCESS OF PRODUCING FURFURAL FROM VEGETAL MATTER USING SOLUBILIZING SALTS AS CATALYSTS

Ralph H. McKee, New York, N. Y., assignor to McKee Development Corp., New York, N. Y., a corporation of New York Application August 24, 1954, Serial No. 451,806

7 Claims. (Cl. 260—347.9)

The present invention relates to an improved process of producing furfural from pentosan-containing material.

It is well known that furfural was discovered many years ago and was found to possess important properties. As those skilled in the art know, furfural has a composition corresponding to $C_5H_4O_2$. Since it is an aldehyde, it has many properties of the common aldehydes, such as formaldehyde and benzaldehyde. For example, it reacts with phenolic substances to give thermosetting plastics of the "Bakelite" type. Such use to form plastics is one of its larger commercial uses. When furfural is freshly distilled, it is a colorless liquid boiling at about 162° C. and freezing at about $-37°$ C. In contact with the air, it rapidly becomes yellow-brown, as do many other aldehydes. It is about $\frac{1}{6}$ heavier than water and is soluble to the extent of about 8 parts in 100 parts water at room temperature (20° C.). Heated with water, it gives a binary azeotrope vapor containing by weight 35% furfural and 65% water and boiling at 97.9° C. Oxidation changes the aldehyde group to an acid group —COOH giving furoic acid. Reduction by hydrogen in the presence of a metal catalyst gives tetrahydrofurfural alcohol, a product also used in plastics. In the presence of alkalies, like most aldehydes, furfural polymerization to a resin rapidly takes place and a similar destructive reaction occurs if strong acids, such as dilute sulfuric acid, and heat are simultaneously present.

It has been possible to obtain furfural in small quantities from many plant organic materials. The first production of furfural dates back to about 1821 and the amount made probably did not exceed a spoonful. Since then, many attempts have been made to develop and improve the processes for producing furfural so as to obtain it in commercial quantities. These processes generally have been based on the treatment of plant materials with an acid or a material producing an acid. This acid or acid salt is not used up and hence is spoken of as a "catalytic agent." These various developments, generally resulting in patents, have not been for using a new catalystic agent nor a new raw material but have been new methods of carrying through the reaction and improved types of equipment.

In one of the early processes, about twelve pounds of ground oats were heated with about twelve pounds of strong sulfuric acid which was diluted with water. This early process of Stenhouse was reported in 1840 and only produced a single ounce of furfural. However, it was probably the first time that it could be said that commercial quantities of raw material were used for the production of furfural. Then years later, Cahours obtained about four ounces of furfural from about nine pounds of wheat bran by heating it with 25% sulfuric acid solution. Some years thereafter, Von Babo more than doubled the percentage yield by heating wheat bran with a dilute solution of zinc chloride. Aqueous solutions of zinc chloride are well known to be strongly acid due to hydrochloric acid formed by hydrolysis of the zinc chloride.

After the early attempts, little more was done until about half a century later when a number of investigators studied the production of furfural and modifications of the process, using an acid catalyst in order to produce better yields at lower costs. Practical success did not come, however, until Ricard evolved new equipment and a new process which were patented in France and the United States and which involved the heating of kapok fiber with dilute hydrochloric acid. There are no records of the exact yields obtained but they were probably but 10% to 20% of that theoretically possible from the pentosan content of the kapok used. The Ricard process supplied the world with furfural, although at a high price of about $6.00 a pound, for a decade or more. Ricard's process as disclosed by his patents included the distilling off of furfural from the reacting materials during the period of its formation. (See U. S. Patent No. 1,322,054.)

The First World War (1914 to 1918) awakened the American chemical world to the need for America to produce important organic chemicals. The Bureau of Chemistry of the Department of Agriculture at Washington conducted investigations relative to the use of agricultural waste materials for various purposes and in particular they worked on the production of furfural from corn cobs. The method used was to heat the comminuted corn cobs with dilute sulfuric acid under pressure and to distill through a relief valve a mixture of steam and furfural vapor. A similar development in a commercial laboratory in Chicago led to patents (see U. S. Nos. 1,735,084 and 1,919,837) and the establishment of the first real commercial production of furfural in the United States at Cedar Rapids, Iowa. In this process, oat hulls were treated at about 150° C. with a small amount of 5% or 10% sulfuric acid and with steam in steam-jacketed rotary digesters. While the amount of furfural, which it was theoretically possible to produce from the pentosans of a given material, was known, the actual increased production over these years was from a minor fraction of 1% to about 50% yield. Further experimental work developed processes using corn cobs, cottonseed hulls, wheat bran, bagasse, and tan-bark as well as oat hulls and other by-products or waste pentosan-containing material. A yield of 55% of that theoretically possible is probably as high as any of the processes described in the published patents and technical literature have reached.

The chemical steps by which pentosans and some related six carbon atom compounds in natural raw pentosan-containing material are changed to furfural by an acid catalyst are as follows:

1. The pentosans add a molecule of water and become pentoses, e. g. xylan $C_5H_8O_4$ becomes xylose $C_5H_{10}O_5$.

2. Pentoses lose successively three molecules of water, i. e., (a) $C_5H_{10}O_5$ less $H_2O$ becomes $C_5H_8O_4$
(b) $C_5H_8O_4$ less $H_2O$ becomes $C_5H_6O_3$
(c) $C_5H_6O_3$ less $H_2O$ becomes $C_5H_4O_2$ (furfural)

The compounds enumerated in steps 1, 2a, and 2b are considered to have ring structure carrying hydroxyl (OH) groups of weak phenolic character. Those noted in 2a and 2b are very reactive. Aldehydes, such as furfural, unite with phenolic hydroxyl groups when acid catalysts are present to give members of the class of plastic resins. For example, "Bakelite" was originally made from phenol and formaldehyde in the presence of an acid catalyst. At present, furfural is substituted in part for formaldehyde for certain uses and complex phenolic compounds have been substituted for simple phenol.

In prior processes, hydrochloric acid or sulfuric acid or strongly acid salts have been the catalysts used to speed up the reactions noted in steps 1, 2a, 2b, and 2c.

The speeding up has been in direct ratio to the acidity of the solutions. However, the destruction of furfural by reacting with the products formed by reactions 1, 2a and 2b to produce dark colored resins has also been in direct ratio to the acidity of the solution. Although many attempts were made to overcome the foregoing destructions and other disadvantages, none, as far as I am aware, was entirely successful when carried into practice commercially on an industrial scale.

I have now discovered that certain neutral salts can be used for the production of furfural. The neutral salts I have found useful for this purpose are known as "hydrotropic" salts or "solubilization" salts according to British nomenclature. These salts are amphiphilic substances. The preferred salts are the readily soluble, neutral alkali mono-sulfonates with a benzene ring having one or more alkyl side chains. The simplest typical salts I have found useful for the manufacture of furfural are sodium cymenesulfonate and sodium xylenesulfonate. Other useful but more expensive neutral salts are salts of salicylic, benzoic, and phenolsulfonic acids. For the metal part of the salt, sodium or potassium are preferred but ammonium or the alkaline earth metals, such as calcium or barium, can be used. My discovery has revealed that all of these neutral salts can function as catalysts of high efficiency for the production of furfural from pentosan-containing material, such as oat hulls, corn cobs, bagasse, hard woods, bamboo, etc.

It is an object of the present invention to provide an improved process for the production of furfural which will result in increased yields.

Another object of the invention is to provide an improved process of producing furfural with a neutral catalytic agent.

Still another object of the invention is to provide an improved continuous process with synergetic catalysts which are self-furnished in the operations.

It is a further object of the invention to provide an improved process of producing furfural from pentosan-containing material by the use of a hydrotropic solution capable of functioning as a catalytic agent under neutral conditions.

The invention further contemplates providing an improved process of producing furfural from pentosan-containing material which can be carried into practice on an industrial scale with conventional equipment.

Other objects and advantages will become apparent from the following description taken in conjunction with the accompanying drawing which illustrates diagrammatically equipment capable of carrying the novel process into practice when conducted on an industrial scale.

In carrying the invention into practice, it is preferred to use a feed tank 1 for the pentosan-containing material. For industrial production, it is preferable to use two or more of such feed tanks. The material suspended in the catalyst solution can be continuously fed by pump 10 to a reactor 2 wherein the furfural is formed by successively reacting the pentosan and pentose constituents in the presence of the aqueous liquor containing a neutral salt catalyst. Furfural so formed is promptly removed from the top of the reactor as a ternary vapor azeotrope by a current of steam and by carbon dioxide bubbles set free by the chemical reaction and passing upwardly. This removal of furfural from the reacting mass is preferably facilitated by an additional current of carbon dioxide injected by pump 12. The excess of the reacting liquor is held in surge tank 3 when feed tank is partly or wholly empty. The surge tank is preferably connected to an intermediate portion of the reactor as shown in the drawing.

A liquor heater 4 of an injector type supplied with steam at about 200 p. s. i. from steam line 16 feeds liquor coming from surge tank 3 via pump 11 to the top and bottom of reactor 2. Other types of liquor heaters, such as a tube and shell, can be used but some steam should be injected. The vapors coming from the top of the reactor 2 go to condenser 5 herein shown to be of tube and shell type. As is customary, this condenser is cooled by cold water which enters the bottom via inlet 14a and which leaves the top via outlet 14b in a heated condition. A dilute water solution of furfural, say from about 3% to about 16%, is condensed from the vapors. Condensate tank 6 separates the liquid furfural solution from the accompanying carbon dioxide gas and permits the return of the major portion of the carbon dioxide gas to the bottom of the reactor by means of pump 12. The excess of carbon dioxide is removed through a relief valve in pipe 13 and either discharged as waste into the atmosphere or piped to the compressors of a Dry Ice plant to make solid carbon dioxide.

Storage tank 7 is provided for the dilute furfural obtained in condenser 5 and separated in condensate tank 6 from carbon dioxide. The pipe leading from condensate tank 6 to storage tank 7 carries a valve (not shown) that controls the liquid level in the former tank, which is under the pressure of reactor 2, but permits reduction of the pressure to approximately atmospheric pressure in storage tank 7 and its connecting pipes. Normally, storage tank 7 will be of tank car type provided with a monitor top and a blow-off valve connected to the feed line of pump 12. The exit pipe shown leads to a suitable distilling and refining unit by which the furfural solution is concentrated and purified to produce commercial grades of furfural as well understood by those skilled in the art.

A strong press 8 is connected to the bottom outlet of the reactor and is capable of largely removing the catalyzing solution from the residue left in the reactor. The solution is returned by pump 11a to the surge tank for reheating and re-use in the reactor for the treatment of further material. In practice, it is preferred to use a roller type of hydraulic press, such as a "Staycomizer" or a screw type of press fed under pressure. The residue is removed by suitable means, such as a screw conveyor 9.

When the improved process is carried into practice on an industrial scale as a continuous operation, a removable head 9a is mounted on feed tank 1 so that one feed tank may be loaded with the comminuted pentosan raw material while the second feed tank is feeding the reactor. As described heretofore, pump 10 is provided at the bottom of feed tank 1 and is a type capable of pumping suspended solids. In case of batch operation, a removable head 9b is used on the top of the reactor. No feed tanks with their bottom pumps are used in the batch type of installation. Usual centrifugal pump 11 pumps liquor from surge tank 3 to heater 4 at slightly above the pressure in the reactor, and centrifugal pump 12 pumps carbon dioxide gas to the bottom of the reactor. It will be noted that none of the equipment is either rotary or steam-jacketed. However, heated vessels should carry insulation to conserve heat.

As those skilled in the art know, appropriate auxiliaries are employed. Thus, relief pipe 13 and valve (not shown) are mounted on the top of the condensate tank 6 to remove excess of carbon dioxide gas. Condensing water inlet 14a is located at the bottom of the condenser and condensing water outlet 14b is located at the top of the condenser. Cooler 15 surrounds the outlet pipe from the reactor to reduce temperature of the catalyzing solution to a temperature below boiling water, say to 90° C., before the solution containing a suspension of solids enters press 8. To maintain suitable thermal conditions in the cooler 15, cooling water is supplied via inlet 14' and heated water is removed via outlet 14".

In addition, valves, level indicators and regulators, temperature indicators and relief valves, and other instruments are provided in the usual manner and are not shown as these auxiliaries are well known to those skilled in the art.

As all of the equipment is in contact with the somewhat corrosive liquor and under pressure and mostly under temperatures of about 150° C. to about 160° C., it has been found preferable to use resistant clad steel or a resistant steel alloy, such as stainless steel, for such equipment.

For the purpoe of giving those skilled in the art a better understanding of the invention and/or a better appreciation of the advantages thereof, the following illustrative examples are given:

EXAMPLE I

To about ten parts dry weight oat hulls, about eighty parts by weight of a 25% solution (pH of 7) of sodium xylenesulfonate were added and the whole heated in a stainless steel reactor at 160° C. for one hour. In other words, the ratio of the solids to solution is about 1:8. The pressure was kept at about 80 lbs. gauge pressure by continual relief of the gas and vapor pressure due to carbon dioxide and furfural set free through the reacting mass. This relief I have found to be a ternary azeotropic vapor mixture of carbon dioxide, water and furfural boiling at a lower temperature than the well known binary liquid water-furfural azeotrope. It was cooled and thereby a separation obtained into a gas phase and a liquid phase. The liquid phase of the condensate gave, on analysis, 45% of the theoretic furfural of that calculated for the 91% pentosans of the oat hulls which had been dissolved. With four additional similar treatments at 160° C. of the filtrate pressed out from the dark colored residue left of the oat hulls, a total yield of 90% of the theory was obtained. It was found that in five passes, the furfural formed in each pass was promptly removed as soon as it was formed. In each of the successive treatments of the filtrate, sufficient water was added to compensate for the water removed in the condensate, thereby bringing back in each case the concentration of the sodium xylenesulfonate solution to 25%.

EXAMPLE II

In this example, the raw material used was dry sugar cane bagasse chopped into pieces of about an inch in length. The ratio of solids to the same neutral 25% hydrotropic solution was again 1:8. A similar reactor and the same temperature, time, pressure, relief equipment and condenser were used except that at the bottom of the reactor a connection was made to a source of carbon dioxide under pressure. As soon as the temperature reached 160° C., a slow stream of carbon dioxide was started bubbling into the hot solution and continued throughout the reaction period.

The residual solution was removed from the dark colored bagasse residue, water added to balance the loss to the condenser and then re-treated three times as was the solution in Example I, except the use of a slow stream of carbon dioxide injected into the bottom of the reactor was repeated each heating. However, the number of re-passes needed as in the continuous modification was only three instead of four as in Example I.

Analysis of the solid residue left in the cooker showed but 3% of pentosan content. Of the dissolved pentosans, the total yield of furfural found on analysis was 88% of that theoretically possible. The anaylses were made in accordance with the method "D688" approved by the American Society for Testing Materials.

In the foregoing examples it is to be understood that the pentosan-containing raw material and the catalyst solution are fed continuously into the reactor. After reacting for a selected period of time in the reactor, the solution containing the suspended residue is continuously removed from the bottom of the reactor via an outlet. From the top of the reactor, the ternary azeotropic vapor mixture is continuously removed.

When the process is conducted on a continuous basis instead of a batch basis with a reactor having a diameter of about five feet, the feed is about two tons per hour on a dry basis. The solution is fed into the reactor at a rate of about 16 tons per hour. The discharge from the reactor is at a rate of about one ton per hour on a dry basis. The temperatures can range from about 145° C. to about 170° C. in the reactor, but is preferably about 150° C. to about 160° C. The selected period of time is usually about one to about two hours. Due to the recycling of the solution and the accumulation of acetic and carbonic acids formed in the process, the final pH of the solution is usually about 3.5. In addition to the formation of acetic and carbonic acids, a trace of formic acid is produced.

The new results produced by the present process can be seen from the following comparative table showing the increased yields of furfural over those obtained by prior processes:

| Material Dry Basis | Pentosan Content, Percent | Potential Furfural, Percent | Prior Processes, Percent Furfural Yield | New Process, Percent Furfural Yield |
|---|---|---|---|---|
| Oat Hulls | 29 | 22 | 12 | 18 |
| Corn Cobs | 30 | 24 | 12 | 18 |
| Cottonseed Hulls | 28 | 21 | 11 | 16 |
| Bagasse | 24 | 18 | 10 | 15 |
| Olive Residue | 25 | 19 | 10 | 15 |
| Poplar | 17 | 12 | 6 | 10 |
| Birch | 22 | 15 | 7 | 12 |
| Maple | 20 | 14 | 7 | 11 |

It is to be noted that the present invention is not to be confused with prior processes. The following table gives the more important distinctions:

*Comparison of prior furfural processes and new process*

| | Prior Processes | New Process |
|---|---|---|
| 1. Dominant Catalyst | Strong Acids | A Neutral Hydrotropic Salt. |
| 2. Secondary Catalysts | None | Weak Organic Acids Produced from Pentosan Raw Material. |
| 3. Acidity of Solution | Very Acid | Nearly Neutral. |
| 4. Ratio of Acidity if New Method is 1 | 100,000 times as acid | 1. |
| 5. Average Composition of Distillate from Cooker | 4% Furfural, 95% Steam, 1% Methanol | 10% Furfural, 75% Steam, 13% $CO_2$, 2% Methanol. |
| 6. Ratio Weight Steam to Furfural | More than 20:1 | About 7:1. |
| 7. Recycle Residual Pentose Solution | No | Yes. |
| 8. Process Continuous | No | Yes or batch. |
| 9. Recycle Catalyst Solution | No | Yes. |
| 10. Recycle $CO_2$ Gas | Never | Yes. |
| 11. Process is self-supplying of acid synergetic catalyst | do | Yes. |
| 12. Weak Organic Acid Catalysts Used | do | Yes, small amounts of carbonic and acetic acids as secondary catalysts. |
| 13. Use of $CO_2$ Gas to Speed Furfural Distillation | do | Yes. |
| 14. Yield of Theory | 55% or less | 90% average. |
| 15. Steam Injected to Dilute Solvent | Never | Yes. |
| 16. Temperature Used | Generally 180° C | About 160° C. |
| 17. Distillate as Ternary Azeotrope | Never | Yes. |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

This invention therefore comprises utilizing neutral salts both as a catalyst for furfural production and as a solubilizing or hydrotropic agent for pentosans.

It is to be understood that the term "neutral salt catalyst" and allied terms as used herein and in the claims are the hydrotropic catalysts as described in column 3, lines 10-28 of this specification, i. e. the dominant catalysts of this furfural process are the neutral readily soluble salts having at least a monocarboxylic or mono-sulfonic substituent on a single benzene ring.

I claim:

1. In the process of preparing furfural from comminuted vegetal material wherein the pentosans of said material is hydrolysed to pentoses and these dehydrated to furfural the improvement comprising reacting said comminuted vegetal material in aqueous suspension in a closed vessel in the presence of a catalytic amount of a catalyst selected from the group consisting of alkali metal, alkaline earth metal and ammonium salts of cymenesulfonic acid, xylenesulfonic acid, salicylic acid, benzoic acid and phenosulfonic acid at a temperature of from about 145° C. to 170° C.

2. The process of claim 1 wherein the reaction is accomplished in the presence of carbon dioxide.

3. The process of claim 1 wherein the reaction is accomplished in an atmosphere of carbon dioxide and steam and removing the furfural formed as a ternary azeotropic vapor of furfural, water and carbon dioxide.

4. In the process of claim 3, the steps comprising cooling the ternary vapor to form a dilute aqueous solution of furfural and uncondensed carbon dioxide gas, separating said dilute solution from said $CO_2$ gas, and re-cycling said carbon dioxide gas to said closed vessel.

5. In the process of preparing furfural from vegetal material containing pentosans the improvement comprising reacting said pentosan containing material in aqueous suspension of about one part by weight of material to about eight parts by weight of a 25 percent solution selected from the group consisting of alkali metal, alkaline earth metal and ammonium salts of cymenesulfonic acid, xylenesulfonic acid, salicylic acid, benzoic acid and phenolsulfonic acid at 145° C. to 170° C. whereby said pentosans are hydrolysed to pentose sugars and finally dehydrated to furfural.

6. The process of claim 5 wherein the organic acid hydrotropic salts are selected from the group consisting of sodium cymenesulfonate and sodium xylenesulfonate.

7. A continuous process for preparing furfural from an aqueous suspension of comminuted pentosan containing material comprising introducing continuously said pentosan containing material to a reactor, heating said pentosan material continuously at 145° C. to 170° C. in said reactor in the presence of a catalytic amount of a concentrated solution selected from the group consisting of alkali metal, alkaline earth metal and ammonium salts of cymenesulfonic acid, xylenesulfonic acid, salicylic acid, benzoic acid and phenolsulfonic acid to obtain furfural, introducing carbon dioxide continuously into the heated aqueous suspension material, removing continuously an azeotropic mixture of furfural, water and carbon dioxide, condensing continuously said furfural and said water to obtain a dilute solution of furfural and uncondensed carbon dioxide gas, re-cycling partly said carbon dioxide gas continuously to said heated aqueous suspension, removing continuously said reacted vegetal material, pressing the reacted vegetal material to obtain recovered aqueous catalyst solution and recycling continuously said recovered aqueous catalyst solution to said reactor.

References Cited in the file of this patent

UNITED STATES PATENTS

| 1,322,054 | Ricard | Nov. 18, 1919 |
| 2,140,572 | Brownlee | Dec. 20, 1938 |

FOREIGN PATENTS

| 130,160 | Australia | Nov. 22, 1948 |
| 585,772 | Great Britain | Feb. 24, 1947 |

OTHER REFERENCES

La Forge et al.: Ind. Eng. Chem. 15, pp. 1057-60 (1923).